J. W. BERRY.
MACHINE FOR TREATING CEREALS.
APPLICATION FILED JULY 28, 1910.

1,014,748.

Patented Jan. 16, 1912.

4 SHEETS—SHEET 1.

Witnesses
Christian S Hofstetter
V. Hamborg

Inventor
John W. Berry
By
R. L. Elliott
Attorney

J. W. BERRY.
MACHINE FOR TREATING CEREALS.
APPLICATION FILED JULY 28, 1910.

1,014,748.

Patented Jan. 16, 1912.
4 SHEETS—SHEET 2.

Witnesses
Christian S. Hofstetter
V. Hamburg

Inventor
John W. Berry
By
P. Elliott
Attorney

J. W. BERRY.
MACHINE FOR TREATING CEREALS.
APPLICATION FILED JULY 28, 1910.
1,014,748.
Patented Jan. 16, 1912.
4 SHEETS—SHEET 4.
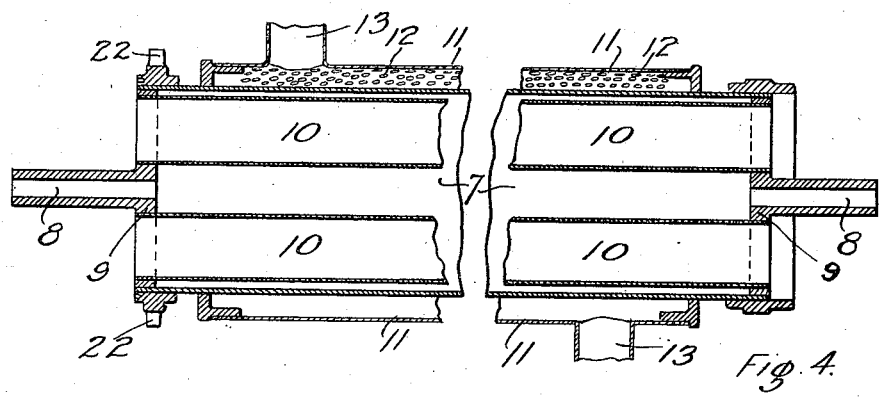
Fig. 4.
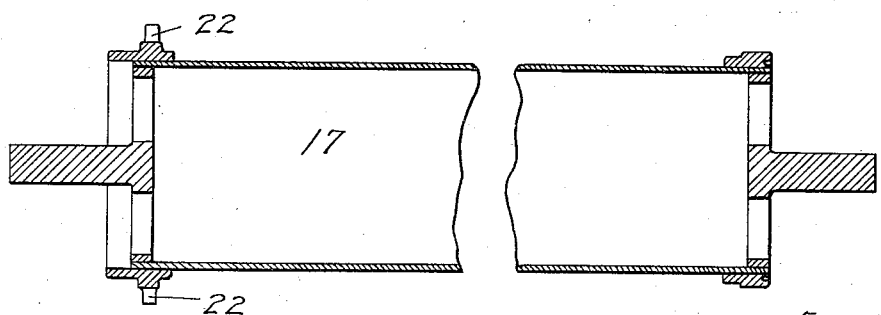
Fig. 5
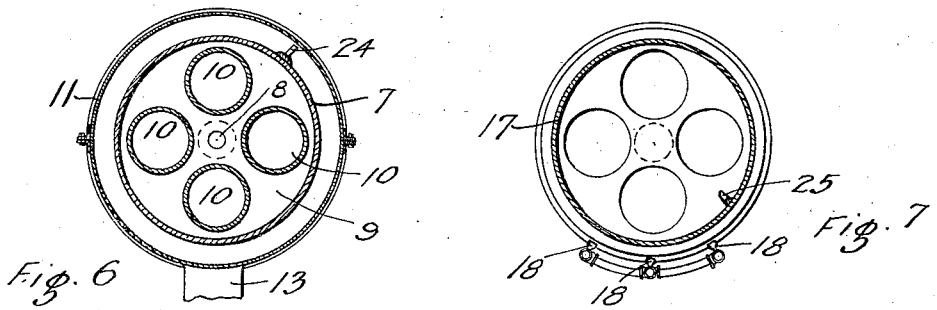
Fig. 6
Fig. 7
Inventor
John W. Berry
Witnesses
Christian S Hofstetter
V. Hamburg
By
P. F. Elliott
Attorney

UNITED STATES PATENT OFFICE.

JOHN W. BERRY, OF TACOMA, WASHINGTON, ASSIGNOR TO CHRISTIAN S. HOFSTETTER, OF TACOMA, WASHINGTON.

MACHINE FOR TREATING CEREALS.

1,014,748.  Specification of Letters Patent.  Patented Jan. 16, 1912.

Application filed July 28, 1910. Serial No. 574,230.

*To all whom it may concern:*

Be it known that I, JOHN W. BERRY, a citizen of the United States, residing at Tacoma, in the county of Pierce and State of Washington, have invented a new and useful Machine for Treating Cereals, of which the following is a specification.

My invention relates to improvements in machinery for treating cereals whereby a palatable, healthy and cheap food is produced, and has for its objects to reduce the length of the machine by passing the grain twice through it by different courses whereby the grain becomes thoroughly dried, roasted, and toasted. I attain these and other objects by the devices, mechanisms, and arrangements illustrated in the accompanying drawings, in which—

Figure 1:
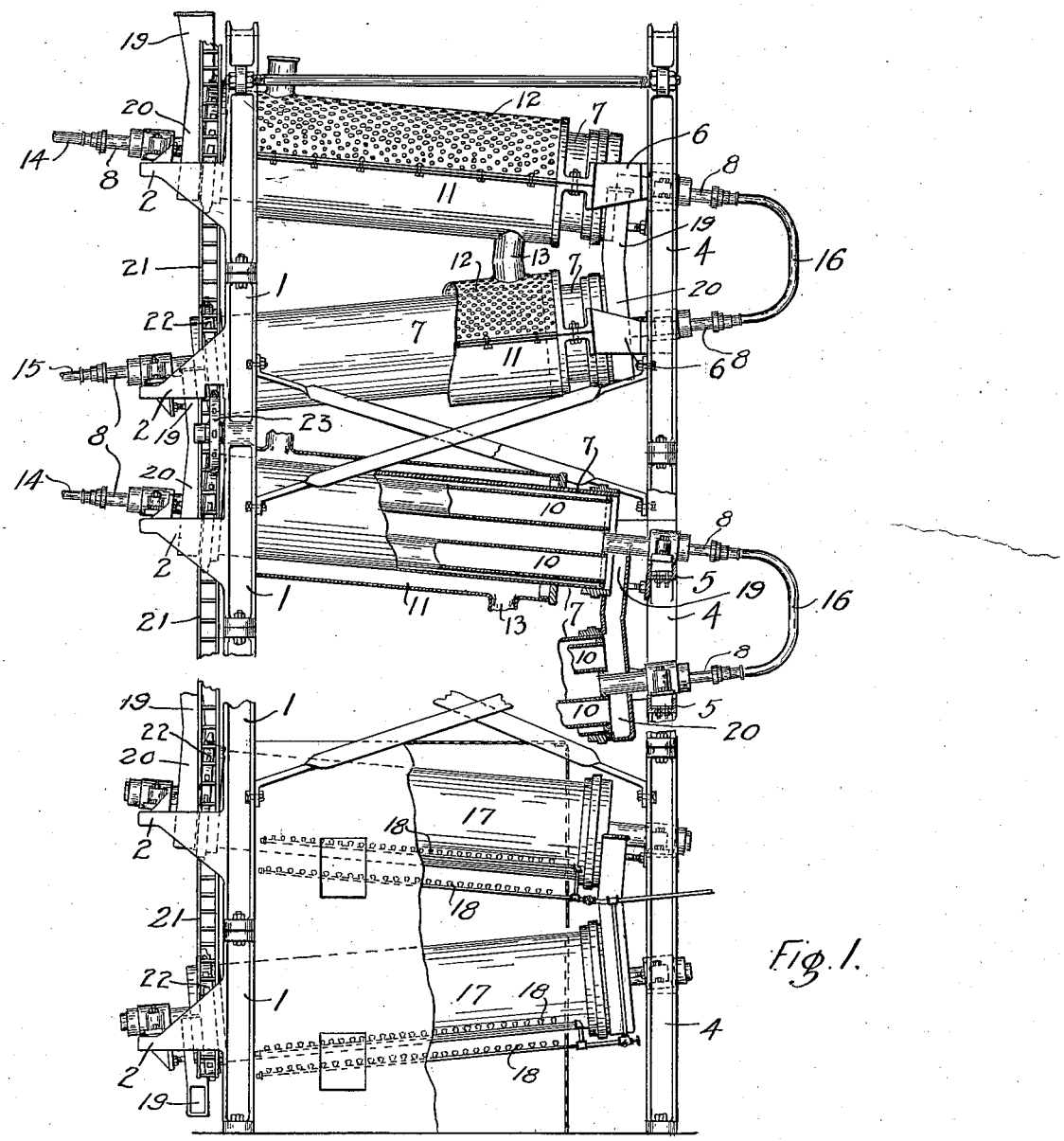
Figure 2:
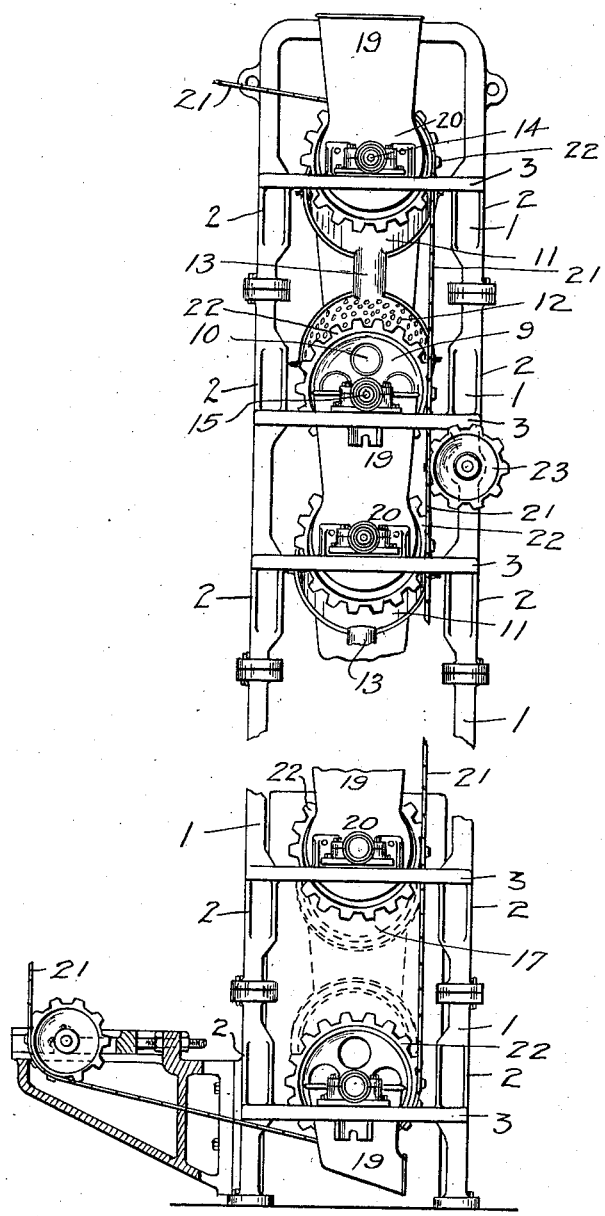
Figure 3:
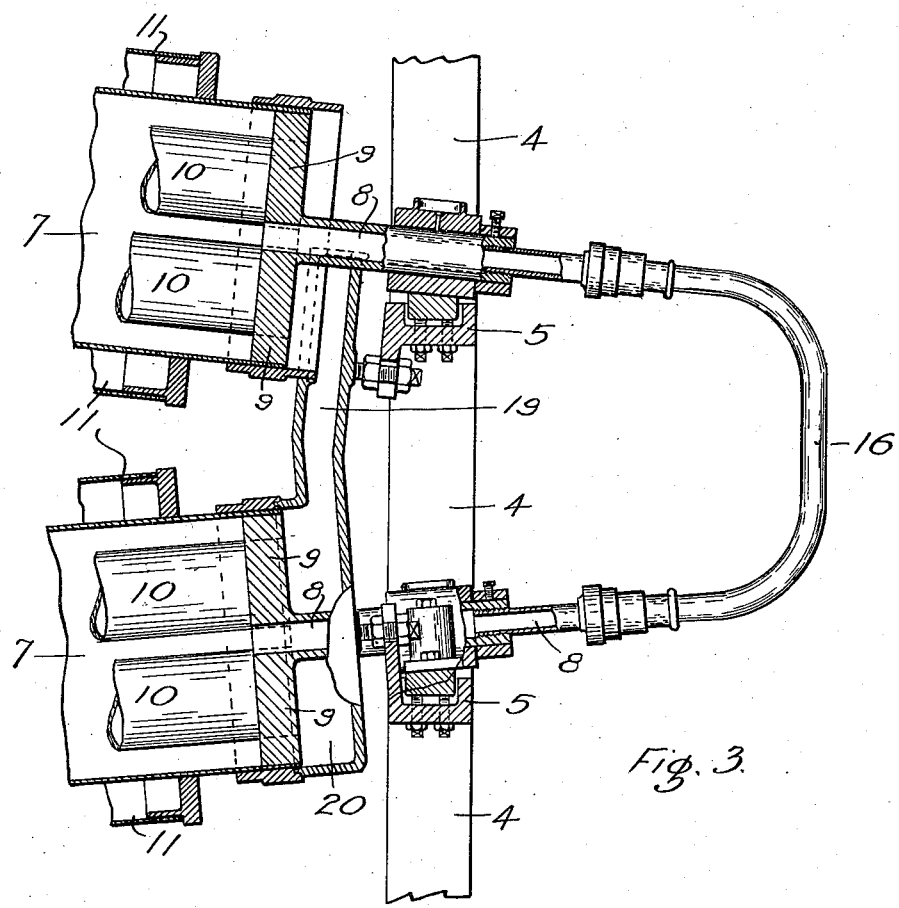

Figure 1 is a front elevation of the machine, the central portion thereof being broken away to reduce it in length and portions thereof being broken to reveal the interior construction; Fig. 2 is a side elevation thereof; Fig. 3 is a sectional view of the ends of two cylinders and the connections thereof; Fig. 4 is a longitudinal section of one of the upper cylinders; Fig. 5 is a similar view of one of the lower cylinders; Fig. 6 is a cross-section of one of the upper cylinders; and Fig. 7 is a similar view of one of the lower cylinders.

Similar numerals of reference refer to similar parts throughout the several views.

The frame of this machine is formed in sections, the sections of one end being similar to each other, but different from the sections forming the other end of the machine. The sections 1 of the left hand end of the machine (Fig. 1) are provided with suitable brackets 2 extending outwardly therefrom, and said brackets 2 are joined together across the end of the machine by means of cross bars 3. The sections 4 which form the right hand end of the machine are provided with cross bars 5 and with inwardly extending brackets 6, to which are secured, as hereinafter described, the right hand ends of the fixed outer drums. The sections 1 and 4 are suitably secured together by braces, bars, or other means. A series of rotating cylinders 7, are mounted on axles 8, which pass through suitable bearings secured on the cross bars 3 and 5. The axles 8 of the cylinders are formed hollow and are secured to the heads 9 of the cylinders 7, the holes therethrough passing also through the heads to the interior of the cylinders 7. A plurality of tubes 10 pass through the interior of the cylinders 7 from end to end thereof and are open at both ends. The cylinders 7 rotate within concentric stationary drums 11, said drums being secured at one end to the brackets 6 and at the other end to the sections 1. The upper parts of the drums 11 are perforated with a number of holes 12 to allow the free escape therefrom of the moisture from the grain as it is warmed. The drums 11 are connected together by means of suitable spouts 13. The drums 11, and the cylinders 7 within them, are mounted in inclined positions as illustrated in Fig. 1, alternate drums being parallel to each other but adjacent drums being inclined in opposite directions. The spouts 13 connect the lowest points of each drum with the highest point of the next adjacent lower drum so that if the grain is admitted into the upper end of the upper drum it will pass on a downgrade through all of the drums to the lower end of the lowest drum.

The hollow axles 8 of the cylinders 7 are secured by means of suitable stuffing boxes to the steam supply pipes 14 or exhaust pipes 15, the preferable arrangement thereof being that the steam is admitted to the upper end of each pair of cylinders and is exhausted from the lower end thereof, while the lower end of the upper and the upper end of the lower cylinders forming a pair are joined together by means of a suitable pipe 16. In this way fresh hot steam is admitted by the pipes 14 to the inside of each alternate cylinder 7, heating it and the tubes 10 therein and the space between the cylinders and the jacketing drums 11, and then passing therefrom to the next lower cylinder, where it performs similar functions and from which it is exhausted by the pipe 15. The two cylinders 17 at the bottom of the machine differ from the cylinders 7 in that they have no interior tubes 10 and their axles are solid. The heads of said cylinders 17 have holes therethrough, and there is no encircling drum, the said cylinders 17 being heated on the outer surface by means of suitable gas jets 18 and being inclosed in a suitable box.

The lower ends of each of the rotating cylinders 7 and 17 engage the receiving ends of suitable chutes 19 adapted to receive the grain from the tubes 10 and to convey it to the hoppers 20 within which the upper ends of the next lower cylinders rotate in such manner as to receive the grain from the hoppers within the tubes 10 thereof. Thus it will be seen that the grain has a continuous passage from the upper end of the upper cylinder 7 to the lower end of the lower cylinder 17 through the tubes 10, in all the cylinders 7, and through the interior of the cylinders 17 from which it is conveyed to suitable chutes. It is therefore apparent that a double set of passages is provided to convey the grain from the top to the bottom of the machine, the one outside of the cylinders and the other inside of them.

The cylinders 7 and 17 are rotated by means of a suitable sprocket chain 21 which engages sprocket wheels 22, mounted on the left hand end of each cylinder, said chain 21 being held in contact with the wheels 22 by means of suitably positioned idler wheels 23. The cylinders 7 have suitable projections 24, forming a comb, secured to their outer surfaces, within the drums 11, said comb being adapted to stir the grain in the space between the cylinders and the drums and to carry it over the top of the cylinders. The cylinders 17 have similar comb-like projections 25 secured to their inner surfaces said combs having a similar stirring and lifting action on the grain therein.

The operation of this machine is briefly described as follows:—The fresh grain is admitted through the upper spout 13 into the upper end of the upper drum 11. Here it is heated slightly by the action of the steam within the cylinder 7, the grain coming into more or less intimate contact with said cylinders and passing from one such drum 11 to the next through the spouts 13, becoming gradually heated and having its moisture entirely driven out through the holes 12 in the drums. As soon as it reaches the lower end of the lowest drum 11, it is received in a suitable conveyer (not shown in the drawings) and is carried to the top of the machine again where it is emptied into the upper chute 19, from whence it is conveyed through the various hoppers 20 and tubes 10 through the interior of all of the cylinders 7. Since the tubes 10 are completely surrounded by steam, this part of the process is much hotter than the first part and by the time the grain has reached the lower cylinder 7, it is in a roasted condition and when it passes from the lowest cylinder 7 into the interior of the upper cylinder 17, where it comes in contact with the gas heated surface of said cylinders, it becomes toasted and is delivered therefrom in the desired condition. The drums 11, filled with grain, form an almost perfect nonconducting jacket for the cylinders and prevent the radiation of heat therefrom, and since the grain at the top is cold and becomes gradually heated as it falls it is evident that such heat as the jacket absorbs is greatest at the top and that therefore the lowest cylinder 7 is the hottest.

A number of different changes can be made in the details of the construction of this machine without departing from the spirit thereof and I desire it to be understood that I do not wish to confine myself to such details as are herein shown and described.

Having described my invention, what I claim is:

1. In a machine for treating cereals, the combination with a frame; of a series of stationary ventilated drums mounted thereon; a series of heated rotating cylinders concentric with said drums and spaced therefrom; and passages joining adjacent drums whereby the cereal is conveyed from one drum to another and is heated by said cylinders.

2. In a machine for treating cereals, the combination with a frame; of a series of stationary ventilated drums mounted thereon; a series of cylinders concentric with said drums and spaced therefrom; projections secured to the outer surface of said cylinders and adapted to stir the grain in the space between the cylinder and the drum and to carry it over the cylinder; passages joining adjacent drums whereby the cereal is conveyed from one drum to another; means for conveying heat into the interior of said cylinders; and means for rotating said cylinders.

3. In a machine for treating cereals, the combination with a frame; of a series of stationary ventilated drums mounted thereon; a series of cylinders having closed ends mounted concentric within said drums, spaced therefrom, jacketed thereby, and extending therethrough; passages joining adjacent drums whereby the cereal in the jacket spaces is conveyed from one drum to another; means whereby the cylinders are rotated; means whereby heat is conveyed into the interior of said cylinders; a plurality of tubes passing through the interior of said cylinders from end to end, through the closed ends thereof, and open at their ends; and hoppers engaging the ends of said cylinders to receive the grain from the open ends of the tubes of one cylinder and to convey it to the tubes of another cylinder, all whereby the grain is dried and slightly heated within the jackets and is roasted in the tubes, substantially as and for the purpose described.

4. In a machine for treating cereals, the combination with a frame; of a series of cylinders, having closed ends, mounted thereon; means whereby said cylinders are rotated; means whereby heat is conveyed into the interior of said cylinders; a plurality of tubes passing through the interior of said cylinders from end to end, through the closed ends thereof, and open at their ends; and hoppers engaging the ends of said cylinders and adapted to receive the grain from the open ends of the tubes of one cylinder and convey it to the tubes of another cylinder.

5. In a machine for treating cereals, the combination with a frame; of bearings mounted thereon; hollow axles mounted in said bearings; a cylinder mounted on said axles and having closed ends, said axles opening into the interior thereof and adapted to supply heat thereto; means whereby said cylinder is rotated; a jacket for said cylinder; tubes passing through the cylinder from end to end, through the closed ends thereof, and open at their ends; and a hopper engaging the end of the cylinder and adapted to convey the grain to the tubes.

JOHN W. BERRY.

Witnesses:
CHRISTIAN S. HOFSTETTER,
M. F. McNEIL.

Copies of this patent may be obtained for five cents each, by addressing the "Commissioner of Patents, Washington, D. C."